United States Patent
Terahara (10) Patent No.: US 9,519,897 B2
(45) Date of Patent: Dec. 13, 2016

(54) READING APPARATUS AND COMMODITY SALES DATA PROCESSING APPARATUS

(71) Applicant: TOSHIBA TEC KABUSHIKI KAISHA, Shinagawa-ku, Tokyo (JP)

(72) Inventor: Toshiyasu Terahara, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/689,143

(22) Filed: Apr. 17, 2015

(65) Prior Publication Data
US 2015/0302379 A1 Oct. 22, 2015

(30) Foreign Application Priority Data

Apr. 18, 2014 (JP) ................. 2014-086808

(51) Int. Cl.
*G06Q 20/20* (2012.01)
*G06Q 10/08* (2012.01)
*G07G 1/00* (2006.01)

(52) U.S. Cl.
CPC .......... *G06Q 20/208* (2013.01); *G06Q 10/087* (2013.01); *G07G 1/009* (2013.01)

(58) Field of Classification Search
CPC ...................................... G06Q 20/20
USPC ........................ 235/375, 451, 439
See application file for complete search history.

(56) References Cited

U.S. PATENT DOCUMENTS

| | | | | |
|---|---|---|---|---|
| 2006/0208072 A1* | 9/2006 | Ku | ....................... | G06K 7/0008 235/383 |
| 2008/0197194 A1* | 8/2008 | Flood | .................... | B30B 9/3007 235/385 |
| 2010/0288837 A1* | 11/2010 | Tomiyama | ......... | G06K 7/10336 235/383 |
| 2011/0140380 A1* | 6/2011 | Ulrich | .................. | B62B 5/0096 280/33.992 |
| 2012/0044054 A1* | 2/2012 | Hussain | ............. | G06K 7/10178 340/10.1 |
| 2012/0302228 A1* | 11/2012 | Gray | ...................... | H02J 3/382 455/422.1 |
| 2013/0033381 A1* | 2/2013 | Breed | ..................... | B60T 1/005 340/568.1 |
| 2013/0241699 A1* | 9/2013 | Covaro | ............. | G06Q 10/0875 340/10.1 |
| 2014/0027511 A1* | 1/2014 | Plocher | .................... | G06K 7/10 235/439 |
| 2014/0138440 A1* | 5/2014 | D'Ambrosio | .......... | G06Q 50/22 235/385 |

(Continued)

FOREIGN PATENT DOCUMENTS

JP 2007-264918 10/2007

*Primary Examiner* — Allyson Trail (74) *Attorney, Agent, or Firm* — Amin, Turocy & Watson LLP; Gregory Turocy (57) ABSTRACT

In accordance with one embodiment, a reading apparatus which reads information from a RFID tag attached to a commodity comprises a housing which includes an opening serving as an entrance/exit of the commodity and space for housing the commodity inside; an antenna arranged in the space; an opening and closing lid for opening and closing the opening; a reading module which reads information relating to the commodity from the RFID tag attached to each commodity housed in the housing through the antenna; and an output module which outputs the information read by the reading module.

7 Claims, 9 Drawing Sheets

(56) References Cited

U.S. PATENT DOCUMENTS

2015/0127362 A1* 5/2015 DeBusk ............... G06F 19/328
  705/2
2015/0217985 A1* 8/2015 Raley ................... B67D 1/0888
  700/237

* cited by examiner

READING APPARATUS AND COMMODITY SALES DATA PROCESSING APPARATUS

CROSS-REFERENCE TO RELATED APPLICATION

This application is based upon and claims the benefit of priority from Japanese Patent Application No. 2014-086808, filed Apr. 18, 2014, the entire contents of which are incorporated herein by reference.

FIELD

Embodiments described herein relate generally to a reading apparatus and a commodity sales data processing apparatus.

BACKGROUND

Conventionally, there exists a commodity sales data processing apparatus which reads commodity information from a RFID tag (RFID chip) attached to each commodity and carries out sales registration and checkout processing based on the read commodity information. For example, there is proposed a reading apparatus that collectively reads the commodity information when the commodities or a shopping basket that houses the commodities are placed on a checkout counter in which a plate-shaped antenna is arranged.

In recent years, there has appeared a commodity sales data processing apparatus (also called as a self checkout apparatus, self-checkout POS (Point Of Sales) terminal, or self-register device) which is used by a customer to carry out the commodity sales registration and the commodity checkout processing by himself/herself. Generally, the customer scans, with a scanner arranged in such a self checkout apparatus, a code symbol attached to the commodity to carry out the commodity sales registration.

Incidentally, in a case in which the RFID tag reading apparatus is applied to the self checkout apparatus, the customer reads the RFID tag by himself/herself. However, in the constitution of a conventional reading apparatus, the space where the plate-shaped antenna reads the RFID tag is connected with (not separated from) the space where the customer and the like exists. As a result, the environment (space) surrounding the reading apparatus may bring bad influence to the reading of the RFID tag, which may reduce the efficiency of the reading processing.

DETAILED DESCRIPTION

In accordance with one embodiment, a reading apparatus which reads information from a RFID tag attached to a commodity comprises a housing which includes an opening serving as an entrance/exit of the commodity and space for housing the commodity inside; an antenna arranged in the space; an opening and closing lid for opening and closing the opening; a reading module which reads information relating to the commodity from the RFID tag attached to each commodity housed in the housing through the antenna; and an output module which outputs the information read by the reading module.

Figure 1:
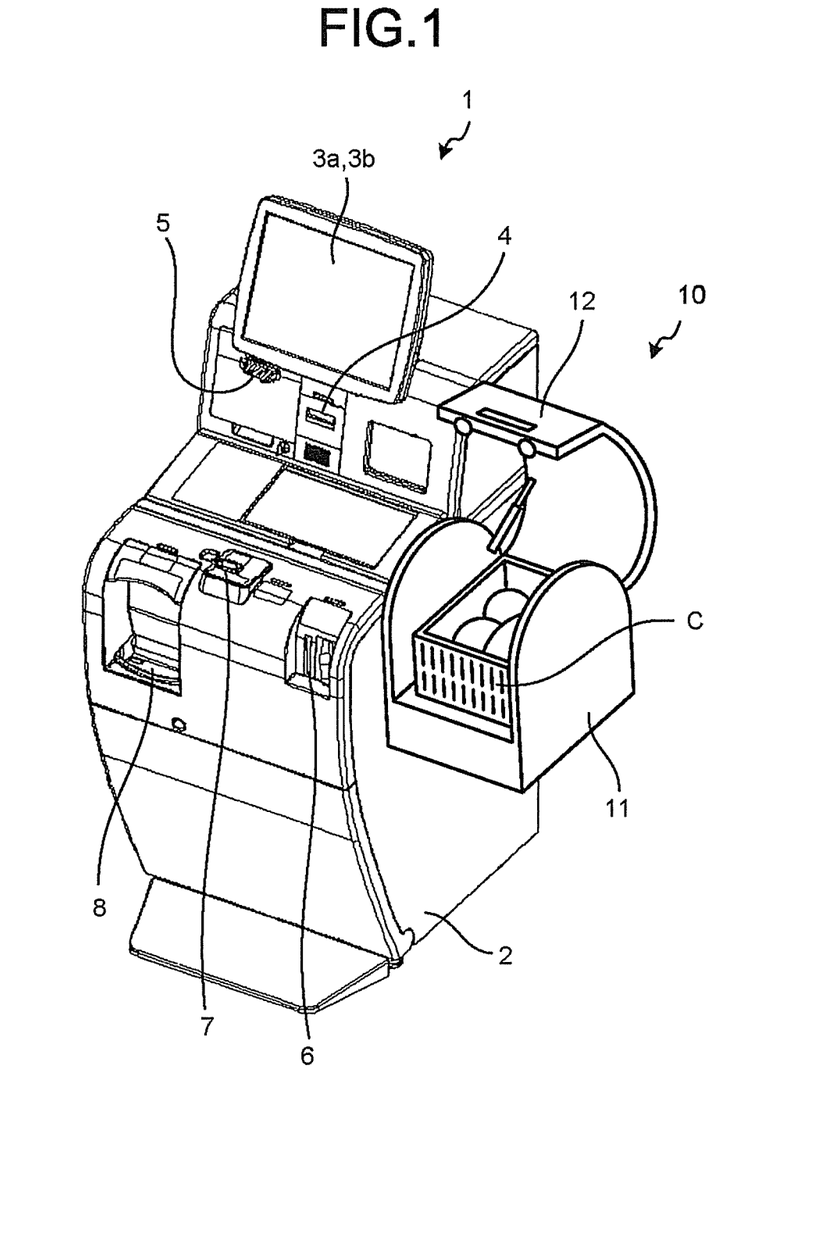
FIG. 1 is an external perspective view illustrating the constitution of a self checkout apparatus according to one embodiment.

FIG. 1 is an external perspective view illustrating the constitution of a self checkout apparatus 1 according to the present embodiment. The self checkout apparatus 1 serves as a commodity sales data processing apparatus which is used by a customer to carry out commodity sales registration and commodity checkout processing by himself/herself. The self checkout apparatus 1 is used in, for example, a super market or a store such as a clothing store and the like. On a main body 2 of the self checkout apparatus 1 is arranged, for example, a liquid crystal display device equipped with a display 3b and a touch panel 3a arranged on the surface of the display 3b.

A card inserting port 4 for inserting a point card or a credit card of the customer during the settlement processing and a receipt issuing port 5 for issuing a receipt are arranged in the main body 2 of the self checkout apparatus 1. The main body 2 is further equipped with a bill depositing and dispensing port 6 for depositing bills and dispensing change during the settlement processing, a coin depositing port 7 for depositing coins during the settlement processing, and a coin dispensing port 8 for dispensing change coins.

A reading apparatus 10 which reads the RFID (Radio Frequency Identifier) tag attached to the commodity is arranged at the right side of the main body 2. The reading apparatus 10 is connected with the self checkout apparatus 1 through a cable (not shown) and the like, and outputs (sends) various kinds of information read from the RFID tag attached to the commodity to the self checkout apparatus 1. Herein, it is assumed that the RFID tag (not shown) in which a commodity code for identifying the commodity is recorded is attached to each commodity; and a storage area for writing a later-described registration completion flag is prepared in the RFID tag.

Figure 2:
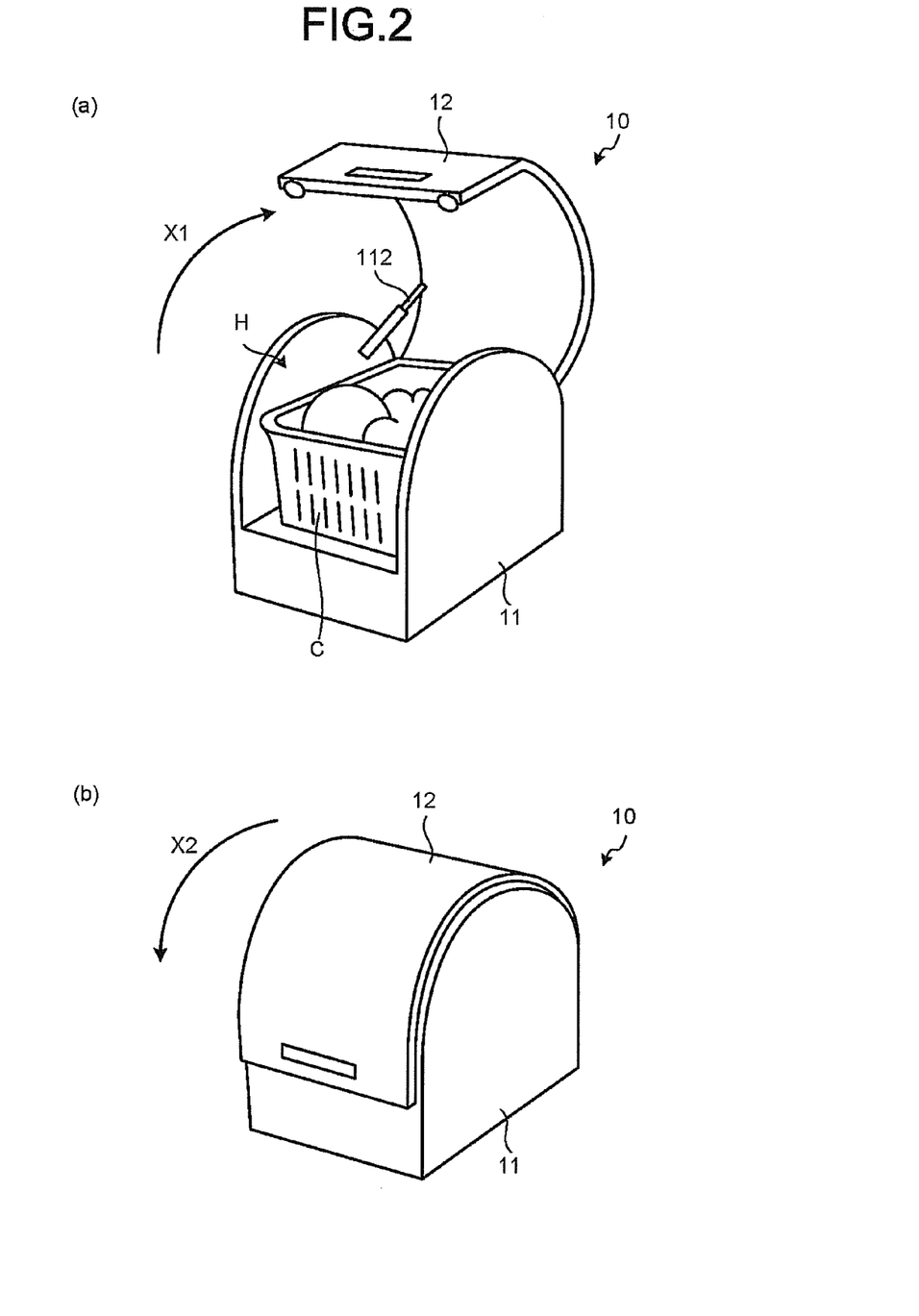
FIG. 2 is an external perspective view illustrating the schematic constitution of a reading apparatus according to the embodiment.
Figure 3:
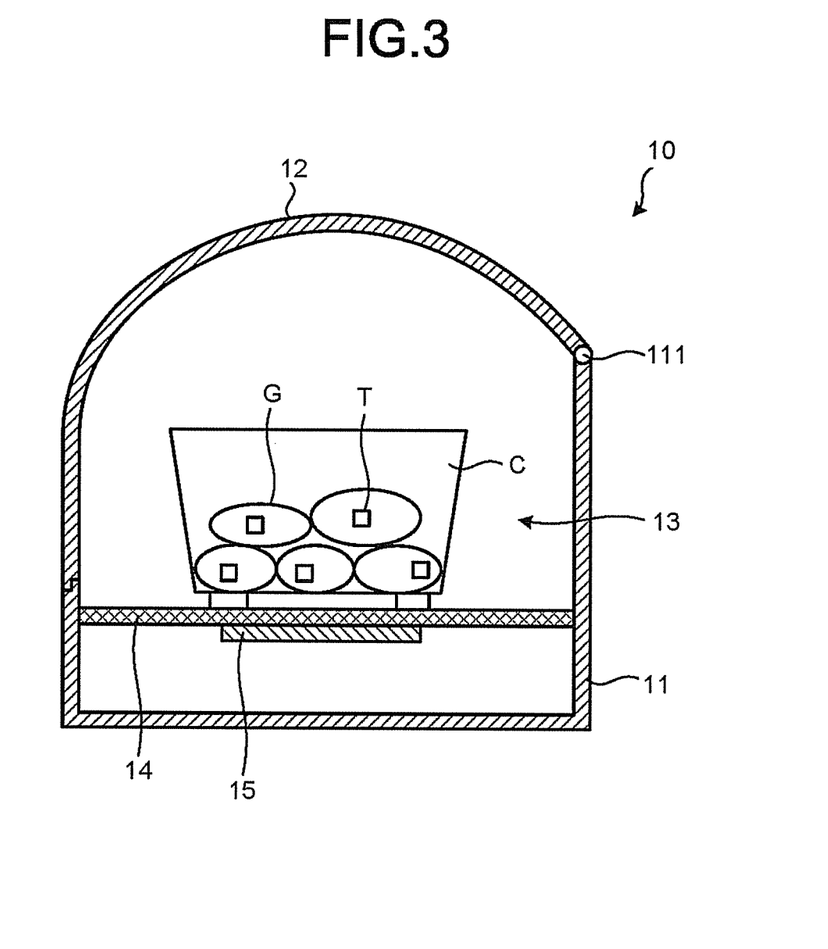
FIG. 3 is a schematic cross-sectional view illustrating the reading apparatus.

Hereinafter, the reading apparatus 10 is described. FIG. 2 is an external perspective view illustrating the schematic constitution of the reading apparatus 10. FIG. 2 (*a*) shows an opened state in which an opening and closing lid 12 of the reading apparatus 10 is opened; FIG. 2 (*b*) shows a closed state in which the opening and closing lid 12 of the reading apparatus 10 is closed. FIG. 3 is a schematic cross-sectional view illustrating the reading apparatus 10 of which the opening and closing lid 12 is in the closed state.

The reading apparatus 10 is equipped with a housing 11 constituting the main exterior of the reading apparatus 10, and the opening and closing lid 12 for opening and closing an opening H which is arranged in the housing 11 and serves as the entrance/exit of a shopping basket C (commodity G). The housing 11, a substantial box, is formed into such a proportion that the depth is longer than the width, that is, the housing 11 is longer in the depth direction. The opening H is formed into such a size that the shopping basket in which the commodity G is housed can pass through. Further, the housing 11 includes a reading room 13 that is large enough to house the shopping basket C inside.

In order to prevent external electric waves from reaching into the reading room 13, the housing 11 and the opening and closing lid 12 are made with a material (electric wave reflecting material) that reflects external electric waves or a material (electric wave absorbing material) that absorbs electric waves. Incidentally, a well-known electric wave reflecting material or electric wave absorbing material such as metal, mold material, ferrite and the like may be used as such a material. Alternatively, for example, it is also applicable that the outer wall (outer surface) of the housing 11 and the opening and closing lid 12 and the inner wall (inner surface) of the housing 11 and the opening and closing lid 12 that forms the reading room 13 are covered with the electric wave reflecting material or the electric wave absorbing material.

The opening and closing lid 12 can be turned into the opened state (FIG. 2 (*a*)) if pulled upwards in a direction indicated by an arrow X1 around a hinge mechanism 111 arranged at the back side of the housing 11. On the contrary, the opening and closing lid 12 can be turned into the closed state (FIG. 2 (*b*)) if pulled downwards in a direction indicated by an arrow X2 around the hinge mechanism 111. The customer can turn the opening and closing lid 12 into the opened state to put or take out the shopping basket C in which the commodity G is housed in or from the reading room 13 of the housing 11 through the opening H of the housing 11. Further, a damper 112 (refer to FIG. 2 (*a*)) may be arranged between the housing 11 and the opening and closing lid 12 to slow down the opening/closing speed of the opening and closing lid 12 and to keep the opening and closing lid 12 in the opened state.

In the reading room 13, the shopping basket C is placed on a placing table 14. The placing table 14 which is an insulative (electric wave permeable) plate-shaped member such as wood or glass is supported in the housing 11 with a certain gap from the housing 11. A planar RFID antenna 15 is arranged at the surface (hereinafter referred to as bottom surface) of the placing table 14 opposite to the placing surface where the shopping basket C is placed. The RFID antenna 15 emits electric waves at UHF band and the like to carry out communication with the RFID tags existing in the reading room 13, that is, the RFID tag T of each commodity G housed in the shopping basket C (refer to FIG. 3). The number of the RFID antennas 15 is not limited to one; it is also applicable to arrange a plurality of RFID antennas 15. The method for arranging the RFID antenna 15 is not limited to the example described above; for example, the RFID antenna 15 may be arranged separately from the placing table 14. Further, the arrangement position of the RFID antenna 15 is not limited to the bottom surface of the reading room 13 or the placing table 14; the RFID antenna 15 may be arranged at other surface such as the lateral surface of the reading room 13.

In accordance with the reading apparatus 10 having such a constitution, the user only needs to put the shopping basket C in the reading room 13 to collectively read the commodities G (RFID tags T) in the shopping basket C. Besides, the reading room 13 where the RFID antenna 15 carries out the reading processing is separated from the space where the customer and the like exists, which can prevent incorrect operations such as withdrawing the commodity during the reading processing. Further, the outer surface of the reading apparatus 10 (the housing 11 and the opening and closing lid 12) is covered with the electric wave reflecting material or the electric wave absorbing material, thus, the reading room 13 is protected from the external electric waves (noises), which can prevent the occurrence of incorrect operations. In this way, with the application of the reading apparatus 10, the influence brought by the environment surrounding the reading apparatus 10 to the reading operation can be reduced, and thus, the reading of the RFID tag T can be carried out more efficiently.

Figure 4:
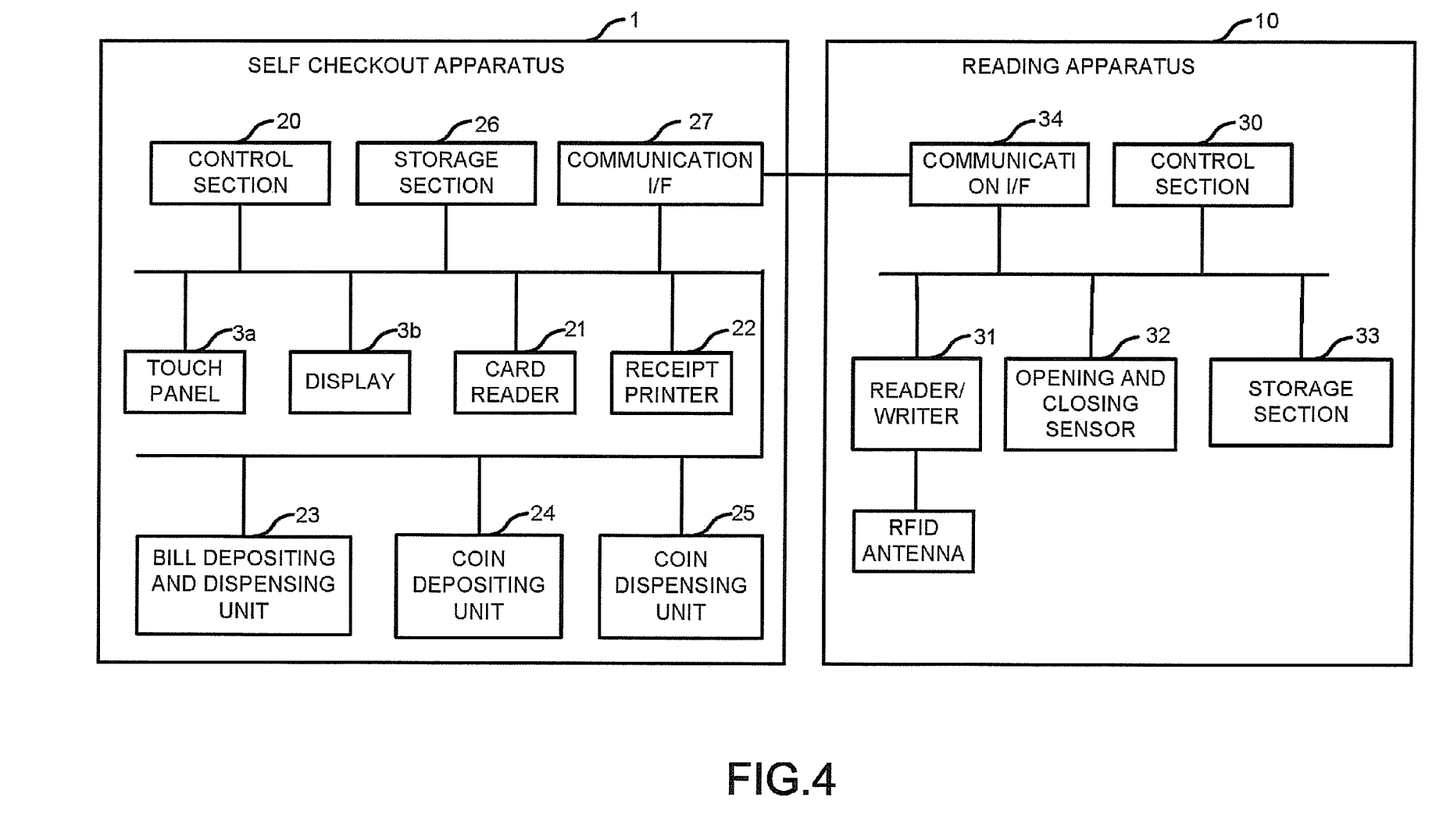
FIG. 4 is a block diagram illustrating the hardware constitution of the self checkout apparatus and the reading apparatus.

Next, the hardware constitution of the self checkout apparatus 1 and the reading apparatus 10 is described. FIG. 4 is a block diagram illustrating the hardware constitution of the self checkout apparatus 1 and the reading apparatus 10.

The self checkout apparatus 1 is equipped with a control section 20 serving as a computer including a CPU (Central Processing Unit), an ROM (Read Only Memory) and an RAM (Random Access Memory). The ROM stores various data and various programs executed by the CPU. The RAM temporarily stores data and programs when the CPU executes various programs.

The control section 20 is connected with the touch panel 3*a*, the display 3*b*, a card reader 21, a receipt printer 22, a bill depositing and dispensing unit 23, a coin depositing unit 24 and a coin dispensing unit 25 through various input/output circuits (not shown).

The card reader 21 reads the information of a point card or a credit card of the customer inserted from the card inserting port 4. The receipt printer 22 prints a receipt after the checkout processing and issues it from the receipt issuing port 5. The bill depositing and dispensing unit 23 processes the bills deposited or dispensed from the bill depositing and dispensing port 6. The coin depositing unit 24 processes the coins deposited from the coin depositing port 7 and the coin dispensing unit 25 processes the coins dispensed from the coin dispensing port 8.

The control section 20 is further connected with a storage section 26 and a communication I/F 27 through various input/output circuits (not shown).

The storage section 26 includes a nonvolatile storage medium such as an SSD (Solid State Drive), or an HDD (hard Disk Drive). The storage section 26 stores various programs and various data relating to the operation of the self checkout apparatus 1. As to the data stored in the storage section 26, for example, a commodity master file in which the commodity information relating to each commodity is registered in association with the commodity code for identifying the commodity is listed. The commodity information includes, for example, a commodity name, a price and the like of the corresponding commodity. The communication I/F 27 carries out the transmission of various data with the reading apparatus 10.

On the other hand, the reading apparatus 10 is equipped with a control section 30 serving as a computer including a CPU, an ROM and an RAM. The ROM stores various data and various programs executed by the CPU. The RAM temporarily stores data and programs when the CPU executes various programs.

The control section 30 is connected with a reader/writer 31, an opening and closing sensor 32, a storage section 33 and a communication I/F 34 through various input/output circuits (not shown).

The reader/writer 31 uses the RFID antenna 15 to emit modulation waves (electric waves) for reading and writing the RFID tag. The reader/writer 31 outputs various kinds of information (for example, the commodity information) read from the RFID tag to the control section 30 through the RFID antenna 15. The reader/writer 31 outputs the information (for example, flag information) of the writing object through the RFID antenna 15 to write the information in the RFID tag.

The opening and closing sensor 32 detects the opened/closed state of the opening and closing lid 12. The opening and closing sensor 32 outputs opened/closed state information indicating the opened/closed state of the opening and closing lid 12 to the control section 30. The opening and closing sensor 32 may be realized through a micro-switch or a magnetic sensor arranged at, for example, the hinge mechanism of the opening and closing lid 12 or the position where the housing 11 is contacted with the opening and closing lid 12. In a case in which the reading room 13 becomes dark in the closed state of the opening and closing lid 12, the opening and closing sensor 32 may be realized through a light sensor arranged in the reading room 13.

The storage section 33 includes a nonvolatile storage medium such as an SSD, or an HDD. The storage section 33 stores various programs and various data relating to the operation of the reading apparatus 10. The communication I/F 34 carries out the transmission of various data with the self checkout apparatus 1.

Figure 5:
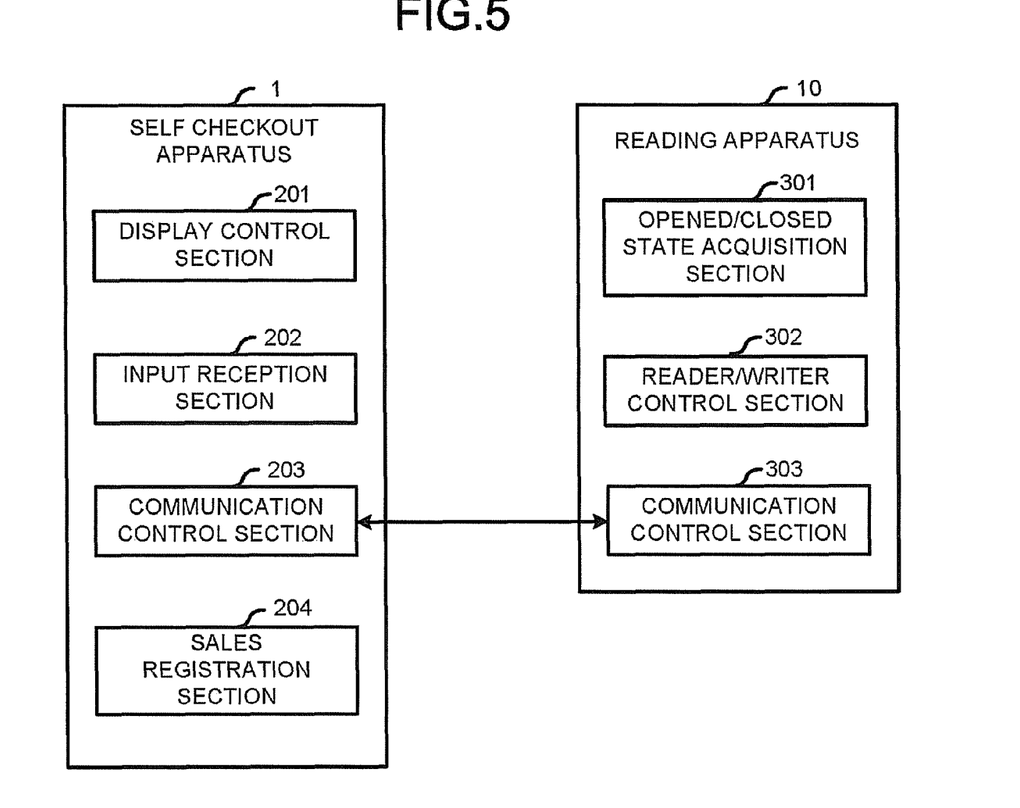
FIG. 5 is a block diagram illustrating the functional components of the self checkout apparatus and the reading apparatus.

Next, the functional components of the self checkout apparatus 1 and the reading apparatus 10 are described. FIG. 5 is a block diagram illustrating the functional components of the self checkout apparatus 1 and the reading apparatus 10.

The control section 20 (CPU) of the self checkout apparatus 1 cooperates with the programs stored in the storage section 26 to realize the functions of a display control section 201, an input reception section 202, a communication control section 203 and a sales registration section 204.

The display control section 201 controls the display 3b to display various screens on the display 3b. For example, the display control section 201 controls to display a screen including an operator (hereinafter referred to as a "reading start button") for instructing the reading start of the commodity code (RFID tag) and an operator (hereinafter referred to as a "reading termination button") for instructing the reading termination. The display control section 201 further controls to read the commodity information corresponding to the commodity code sent from the reading apparatus 10 from the commodity master file and then display deposit amount, change amount, and the commodity name and price of the commodity contained in the commodity information.

The input reception section 202 receives an input operation carried out through the touch panel 3a. For example, in a case in which an operator on the operation screen displayed on the display 3b is operated (touched), the input reception section 202 outputs the instruction information corresponding to the operator to the control section 20.

The communication control section 203 controls the communication I/F 27 to transmit various kinds of information between the self checkout apparatus 1 and the reading apparatus 10. For example, if the reading start button is operated, the communication control section 203 sends the instruction information instructing the reading start to the reading apparatus 10. The communication control section 203 further receives the commodity code sent from the reading apparatus 10. If the reading termination button is operated, the communication control section 203 sends the instruction information instructing the reading termination to the reading apparatus 10. If the sales registration is completed by the sales registration section 204, the communication control section 203 sends the instruction information instructing the registration completion to the reading apparatus 10.

The sales registration section 204, after confirming the payment through the settlement processing for each commodity corresponding to the commodity codes sent from the reading apparatus 10, sales-registers these commodity codes as the commodities the customer purchased. Specifically, the sales registration section 204 registers the commodity code of each commodity together with the deposit amount, the change amount and the transaction date into the database for registration. The database for registration may be provided in the storage section 26 of the self checkout apparatus 1 or an external device that is capable of communicating with the self checkout apparatus 1.

On the other hand, the control section 30 (CPU) of the reading apparatus 10 cooperates with the programs stored in the storage section 33 to realize the functions of an opened/closed state acquisition section 301, a reader/writer control section 302 and a communication control section 303.

The opened/closed state acquisition section 301 cooperates with the opening and closing sensor 32 to acquire the opened/closed state information indicating whether the opening and closing lid 12 is in the opened state or the closed state.

The reader/writer control section 302 controls the reader/writer 31 to read the RFID tag attached to the commodity and write information in the RFID tag.

Specifically, if the reading-start instruction is sent from the self checkout apparatus 1 and the opened/closed state information acquired by the opened/closed state acquisition section 301 indicates that the opening and closing lid 12 is in the closed state, the reader/writer control section 302 controls to start the reading. On the other hand, if the reading-termination instruction is received from the self checkout apparatus 1, the reader/writer control section 302 controls the reader/writer 31 to terminate the reading processing. Further, if a registration completion instruction is sent from the self checkout apparatus 1, the reader/writer control section 302 controls the reader/writer 31 to start to write the registration completion flag. Herein, the registration completion flag indicates that the sales registration is completed and is written in a pre-determined storage area of the RFID tag.

If the opening and closing lid 12 is turned into the opened state during a period from the moment the RFID tag reading is started to the moment the registration completion flag is written, the reader/writer control section 302 terminates the reading and executes a reset processing to reset the commodity codes that have been read until now. Through such a reset processing, the commodity codes sent to the self checkout apparatus 1 are also reset. The reader/writer control section 302, if confirming that the opening and closing lid 12 is turned into the closed state again, re-executes the RFID tag reading processing.

In this way, even if a new commodity of which the RFID tag is not read yet is put in the shopping basket (reading room 13) before the settlement processing is completed, the RFID tag reading processing is re-executed, which can make sure that all the commodities in the shopping basket are read. Further, even if the commodity of which the RFID tag is already read is taken out of the shopping basket (reading room 13) before the settlement processing is completed, the RFID tag reading processing is re-executed, which can make sure that only the commodities in the shopping basket are read. In addition, it is applicable to notify the self checkout apparatus 1 that the opening and closing lid 12 is turned into the opened state, and display a screen on the display 3b of the self checkout apparatus 1 to notify the user that the opening and closing lid 12 is in the opened state.

The communication control section 303 controls the communication I/F 34 to transmit various kinds of information between the self checkout apparatus 1 and the reading apparatus 10. For example, the communication control section 303 receives the instruction information instructing the reading start sent from the reading apparatus 10. The communication control section 303 sends the commodity code read by the reader/writer control section 302 from the RFID tag to the self checkout apparatus 1. The communication control section 303 receives the instruction information instructing the reading termination sent from the reading apparatus 10. The communication control section 303 further receives the instruction information instructing the registration completion sent from the reading apparatus 10.

Figure 6:
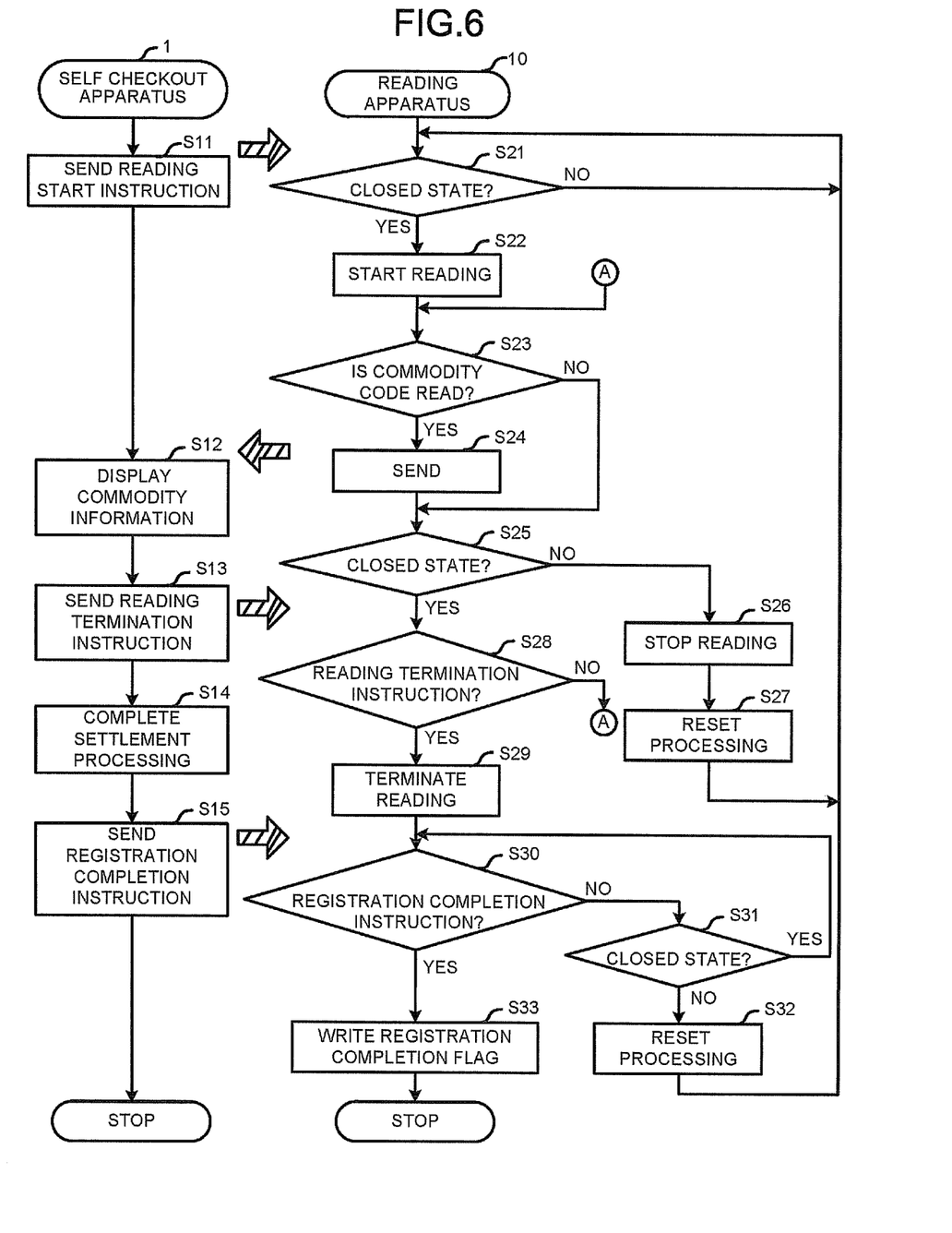
FIG. 6 is a flowchart illustrating, an example of the operations of the self checkout apparatus and the reading apparatus.

Next, the operations of the self checkout apparatus 1 and the reading apparatus 10 are described. FIG. 6 is a flowchart illustrating an example of the operations of the self checkout apparatus 1 and the reading apparatus 10.

The customer who operates the self checkout apparatus 1 opens the opening and closing lid 12 of the reading apparatus 10 to put the shopping basket in which the commodities are housed in the reading room 13. Next, the customer operates the reading start button displayed on the display 3b of the self checkout apparatus 1 to start the reading processing.

In the self checkout apparatus 1, if the input reception section 202 receives the operation of the reading start button, the communication control section 203 controls to send the instruction information instructing the reading start to the reading apparatus 10 (ACT S11).

In the reading apparatus 10, if the communication control section 303 receives the instruction information instructing the reading start, the reader/writer control section 302 determines whether or not the opening and closing lid 12 is in the closed state based on the opened/closed state information acquired by the opened/closed state acquisition section 301 (ACT S21). If it is determined that the opening and closing lid 12 is in the opened state, the reader/writer control section 302 waits until the opening and closing lid 12 is turned into the closed state (NO in ACT S21). During the waiting period in ACT S21, the reader/writer control section 302 may cooperate with the display control section 201 of the self checkout apparatus 1 to display a screen for instructing the user to close the opening and closing lid 12.

In ACT S21, if it is determined that the opening and closing lid 12 is in the closed state (YES in ACT S21), the reader/writer control section 302 controls to start the reading of the RFID tag (ACT S22). Next, the reader/writer 31 determines whether or not the commodity code is read from the RFID tag (ACT S23). If the commodity code is not read yet (NO in ACT S23), the processing in ACT S25 is carried out.

If the commodity code is read (YES in ACT S23), the communication control section 303 sends the read commodity codes to the self checkout apparatus 1 in sequence (ACT S24), and then the processing in ACT S25 is carried out.

Next, in ACT S25, the reader/writer control section 302 determines whether or not the opening and closing lid 12 is in the closed state based on the opened/closed state information acquired by the opened/closed state acquisition section 301 (ACT S25). If it is determined that the opening and closing lid 12 is in the opened state (NO in ACT S25), the reader/writer control section 302 terminates the reading of the RFID tag (ACT S26). Then the reader/writer control section 302 carries out a reset processing to reset the commodity codes that have been read until now (ACT S27), and then the processing in ACT S21 is carried out again.

If it is determined in ACT S25 that the opening and closing lid 12 is in the closed state (YES in ACT S25), the reader/writer control section 302 determines whether or not the reading termination instruction is received from the self checkout apparatus 1 (ACT S28). Herein, if the reading termination instruction is not received (NO in ACT S28), the processing in ACT S23 is carried out again.

For example, in a case in which the RFID tag reading processing is started while the reading room 13 is in an empty state, the loop (YES in ACT S23-ACT S25, and NO in ACT S28) processing is carried out while no RFID tag is read. Thus, to avoid such a state, the RFID tag reading processing may be terminated forcibly if a pre-determined time (for example, five seconds) elapses while no RFID tag is read or if the foregoing loop processing is executed for a pre-determined number of times. Further, in this case, the reader/writer control section 302 cooperates with the display control section 201 of the self checkout apparatus 1 to display a message indicating that no RFID tag can be read.

In the self checkout apparatus 1, if the communication control section 203 receives the commodity code from the reading apparatus 10, the display control section 201 reads the commodity information corresponding to the commodity code from the commodity master file and displays the commodity information on the display 3b (ACT S12).

The customer, after confirming that all the commodities in the shopping basket are displayed with reference to the commodity information displayed on the display 3b, operates the reading termination button displayed on the display 3b. Sequentially, if the input reception section 202 receives the operation on the reading termination button, the communication control section 203 sends the instruction information instructing the reading termination to the reading apparatus 10 (ACT S13).

In the reading apparatus 10, if the communication control section 303 receives the instruction information instructing the reading termination, the reader/writer control section 302 determines that the reading termination instruction is received (YES in ACT S28). Next, the reader/writer control section 302 terminates the reading of the RFID tag (ACT S29).

Sequentially, the reader/writer control section 302 determines whether or not the registration completion instruction is received from the self checkout apparatus 1 (ACT S30). If the registration completion instruction is not received (NO in ACT S30), the reader/writer control section 302 determines whether or not the opening and closing lid 12 is in the closed state based on the opened/closed state information acquired by the opened/closed state acquisition section 301 (ACT S31).

If it is determined that the opening and closing lid 12 is in the closed state (YES in ACT S31), the processing in ACT S30 is carried out again. If it is determined that the opening and closing lid 12 is in the opened state (NO in ACT S31), the reader/writer control section 302 carries out the same reset processing as in ACT S27 (ACT S32), and then the processing in ACT S21 is re-executed.

In the self checkout apparatus 1, if the settlement processing for each commodity displayed as a registration candidate is completed (ACT S14), the sales registration section 204 sales-registers each of these commodities. Then the communication control section 203 sends the instruction information instructing the registration completion to the reading apparatus 10 (ACT S15), and then the processing is terminated.

In the reading apparatus 10, if the communication control section 303 receives the instruction information instructing the registration completion, the reader/writer control section 302 determines that the registration completion instruction is received (YES in ACT S30). The reader/writer control section 302 controls the reader/writer 31 to write the registration completion flag in the RFID tag of each commodity (ACT S33), and then the present processing is terminated.

During the processing of writing the registration completion flag, the reader/writer control section 302 may cooperate with the display control section 201 of the self checkout apparatus 1 to display a screen to notify the user to keep the opening and closing lid 12 closed. After the processing of writing the registration completion flag is completed, the reader/writer control section 302 may cooperate with the display control section 201 of the self checkout apparatus 1 to display a screen to instruct the user to open the opening and closing lid 12.

As stated above, according to the present embodiment, the shopping basket housing the commodities is put in the reading room 13 and the opening and closing lid 12 is closed, thus, the RFID tags attached to each commodity are read collectively in a state of being separated from the space where the customer and the like exists. In this way, the influence brought by the environment surrounding the reading apparatus 10 to the reading operation can be reduced, and thus, the reading of the RFID tag T can be carried out more efficiently.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

For example, it is exemplified in the embodiment described above that the reading of the RFID tag is started in response to an operation instruction from the customer; however, the present invention is not limited to this. For example, the reading of the RFID tag may be automatically started by interlocking with the closing operation of the opening and closing lid 12, without the operation instruction from the customer.

In the embodiment described above, if the opening and closing lid 12 is turned into the opened state during a period from the moment the RFID tag reading is started to the moment the registration completion flag is written, the reading is terminated and the reset processing is executed; however, the present invention is not limited to this. For example, a locking mechanism for keeping the opening and closing lid 12 closed may be arranged at the position where the housing 11 and the opening and closing lid 12 of the reading apparatus 10 are contacted with each other, in this way, a control can be carried out so that the opening and closing lid 12 cannot be opened. Specifically, during a period from the moment the RFID tag reading is started to the moment the registration completion flag is written, the reader/writer control section 302 controls the locking mechanism so that the opening and closing lid 12 is kept in the closed state in which it cannot be opened. In this way, it can be prevented that a new commodity of which the RFID tag is not read yet is put in the shopping basket (reading room 13) before the settlement processing is completed.

It is exemplified in the embodiment described above that the reading of the RFID tag is terminated in response to a termination instruction from the customer; however, the present invention is not limited to this. For example, the reading of the RFID tag may be automatically terminated if a certain number (a number instructed by the customer and indicating the commodity quantity) of RFID tags are read.

Further, in the reading apparatus 10 according to the embodiment described above, the opening and closing lid 12 is of a lid type; however, the present invention is not limited to this. Hereinafter, the reading apparatus 10 equipped with an opening and closing lid of other type is described.

(Modification 1)

Figure 7:
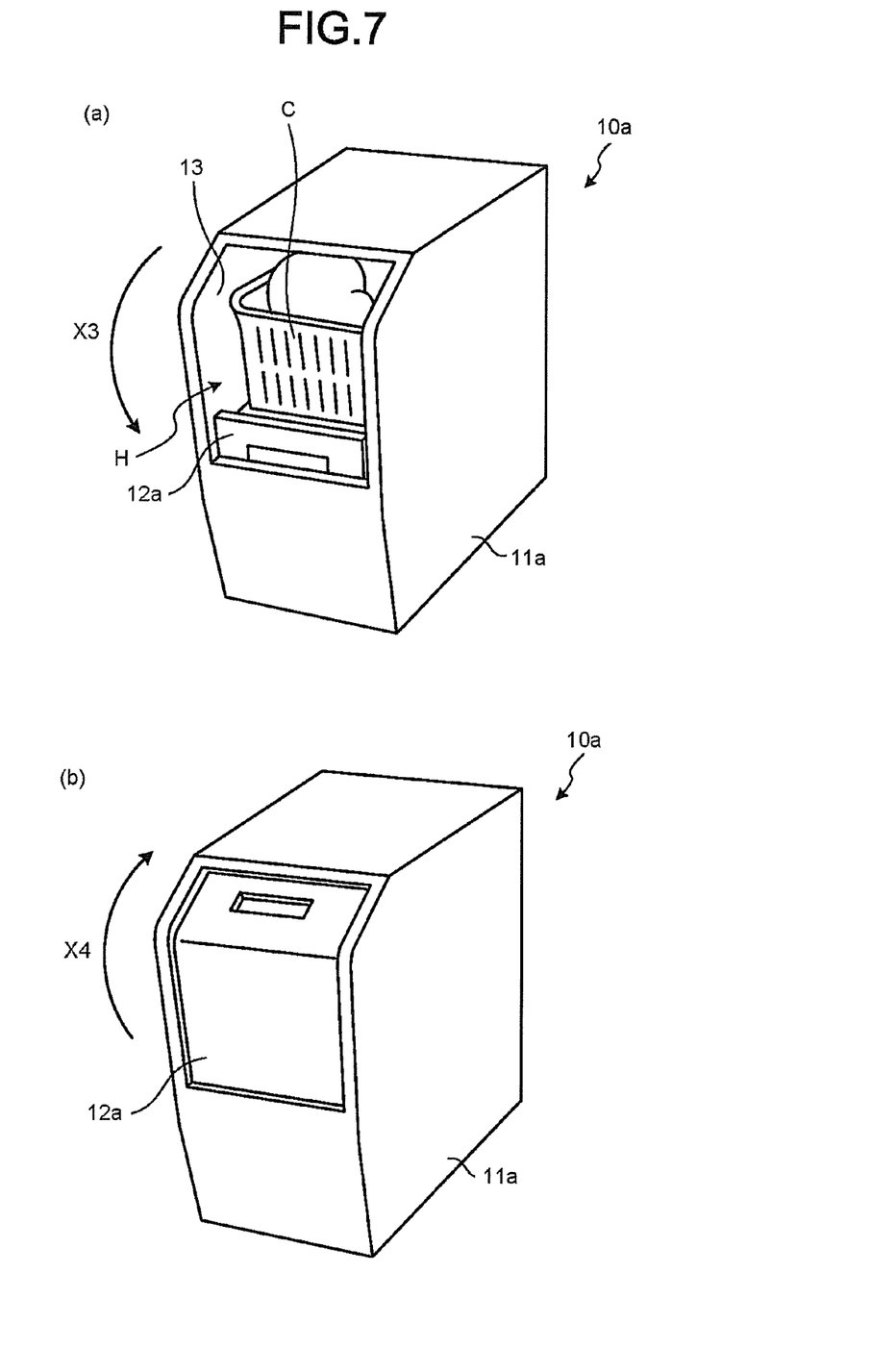
FIG. 7 is an external perspective view illustrating the schematic constitution of a reading apparatus according to the modification 1.

FIG. 7 is an external perspective view illustrating the schematic constitution of the reading apparatus 10a according to the modification 1. FIG. 7 (a) shows an opened state in which an opening and closing lid 12a of the reading apparatus 10a is opened; FIG. 7 (b) shows a closed state in which the opening and closing lid 12a of the reading apparatus 10a is closed.

The opening and closing lid 12a is arranged to cover the opening H arranged at a substantially box-shaped housing 11a. The opening and closing lid 12a is a shutter formed by connecting a plurality of slats and is supported to be capable of sliding along the two edge walls of the opening H. In the example shown in FIG. 7, the opening and closing lid 12a can be turned into the opened state (FIG. 7 (a)) if pulled downwards in a direction indicated by an arrow X3. Further, the opening and closing lid 12a can be turned into the closed state (FIG. 7 (b)) if pulled upwards in a direction indicated by an arrow X4.

In order to prevent external electric waves from reaching into the reading room 13, the housing 11a and the opening and closing lid 12a are made with the electric wave reflecting material or the electric wave absorbing material. For example, it is also applicable that the outer wall (outer surface) of the housing 11a and the opening and closing lid 12a and the inner wall (inner surface) of the housing 11a and the opening and closing lid 12a that forms the reading room 13 are covered with the electric wave reflecting material or the electric wave absorbing material.

In this way, similar to the embodiment described above, the influence brought by the environment surrounding the reading apparatus 10a to the reading operation can be reduced, and thus, the reading of the RFID tag T can be carried out more efficiently. Further, the opening/closing direction and the shape of the opening and closing lid 12a are not limited to the example shown in FIG. 7.

(Modification 2)

Figure 8:
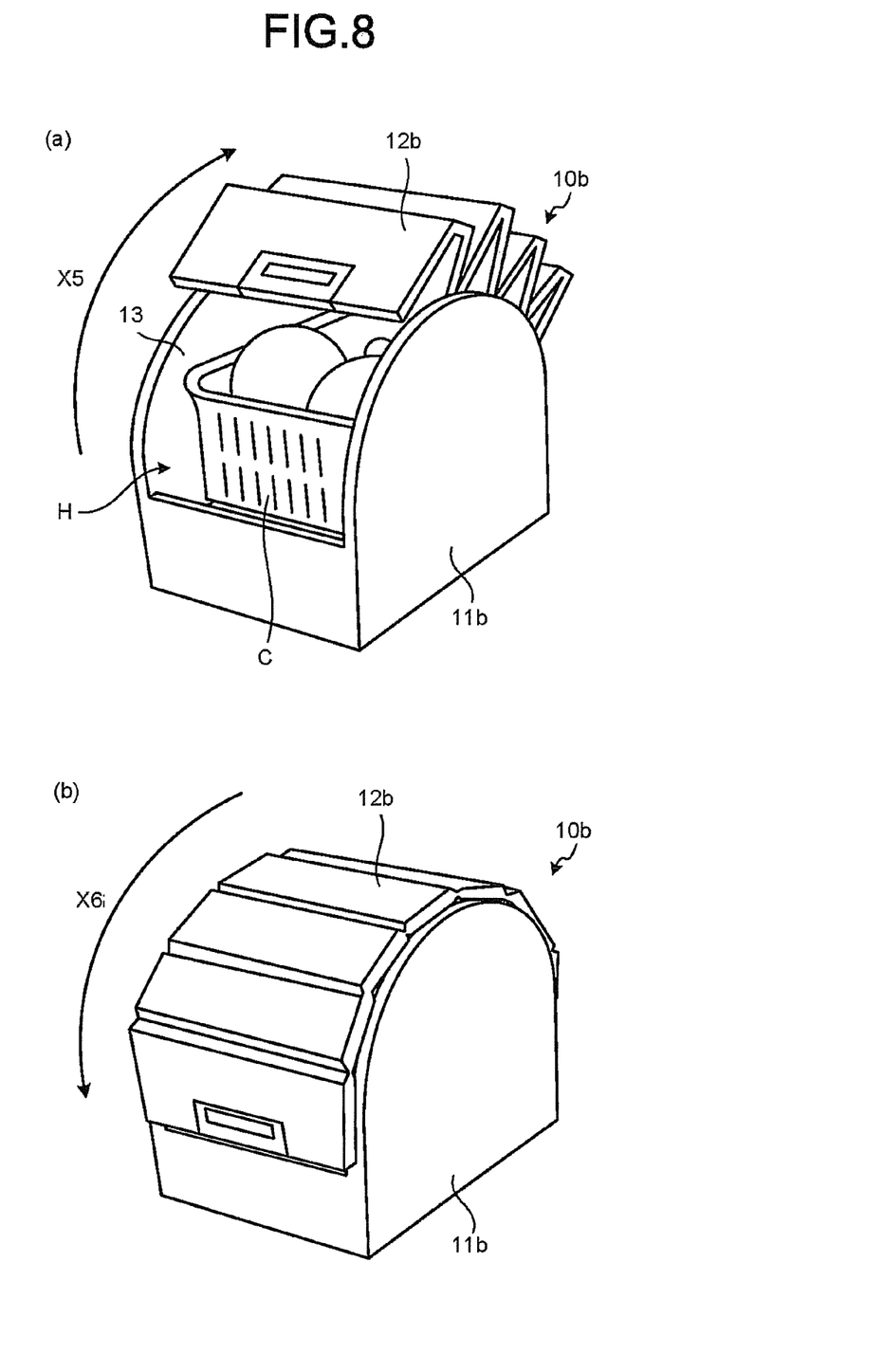
FIG. 8 is an external perspective view illustrating the schematic constitution of a reading apparatus according to the modification 2.

FIG. 8 is an external perspective view illustrating the schematic constitution of the reading apparatus 10b according to the modification 2. FIG. 8 (a) shows an opened state in which an opening and closing lid 12b of the reading apparatus 10b is opened; FIG. 8 (b) shows a closed state in which the opening and closing lid 12b of the reading apparatus 10b is closed.

The opening and closing lid 12b is arranged to cover the opening H arranged at a substantially box-shaped housing 11b. The opening and closing lid 12b is a folding type lid that can be folded into a bellows shape and is supported to be capable of sliding along the two edge walls of the opening H. In the example shown in FIG. 8, the opening and closing lid 12b can be turned into the opened state (FIG. 8 (*a*)) if pulled upwards in a direction indicated by an arrow X5. Further, the opening and closing lid 12b can be turned into the closed state (FIG. 8 (*b*)) if pulled downwards in a direction indicated by an arrow X6.

In order to prevent external electric waves from reaching into the reading room 13, the housing 11b and the opening and closing lid 12b are made with the electric wave reflecting material or the electric wave absorbing material. For example, it is also applicable that the outer wall (outer surface) of the housing 11b and the opening and closing lid 12b and the inner wall (inner surface) of the housing 11b and the opening and closing lid 12b that forms the reading room 13 are covered with the electric wave reflecting material or the electric wave absorbing material.

In this way, similar to the embodiments described above, the influence brought by the environment surrounding the reading apparatus 10b to the reading operation can be reduced, and thus, the reading of the RFID tag T can be carried out more efficiently. Further, the opening/closing direction and the shape of the opening and closing lid 12b are not limited to the example shown in FIG. 8.

(Modification 3)

Figure 9:
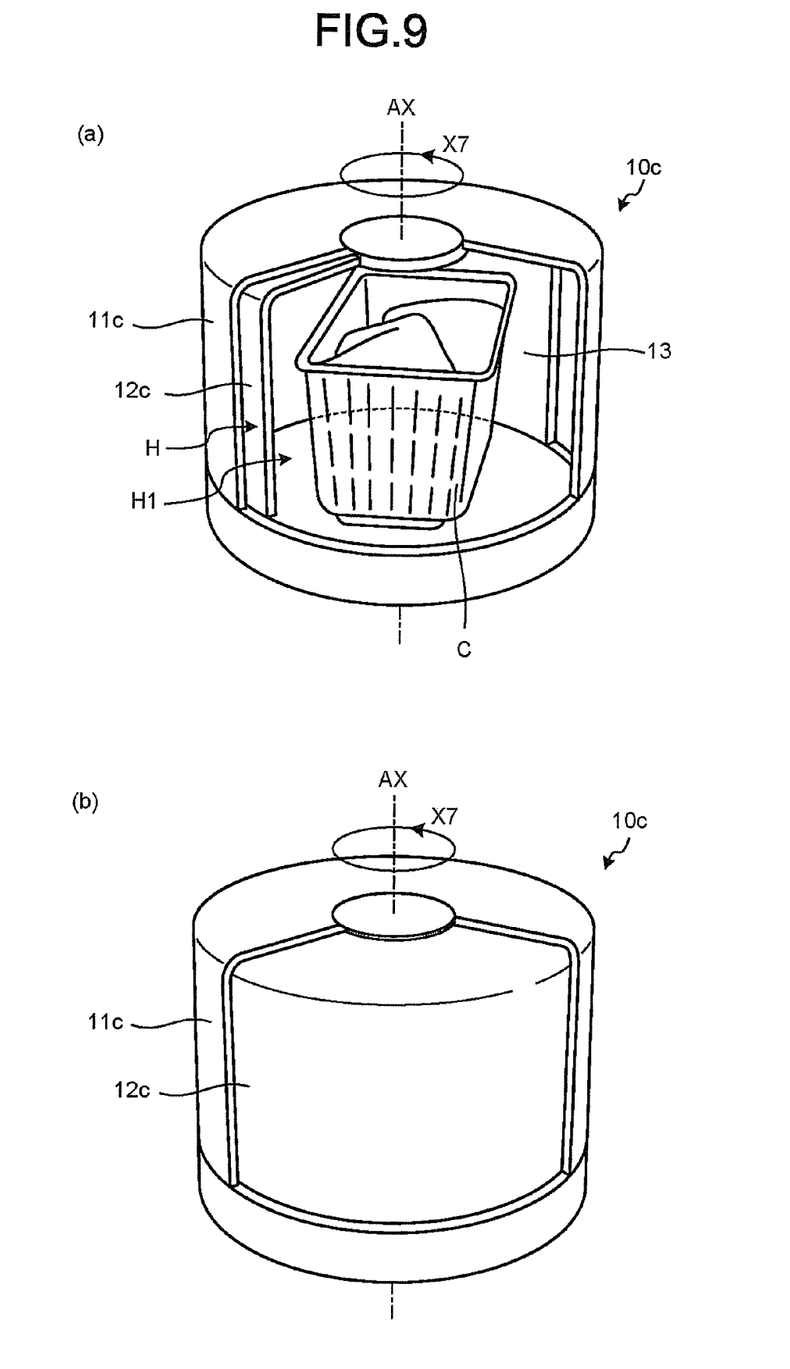
FIG. 9 is an external perspective view illustrating the schematic constitution of a reading apparatus according to the modification 3.

FIG. 9 is an external perspective view illustrating the schematic constitution of the reading apparatus 10c according to the modification 3. FIG. 9 (*a*) shows an opened state in which an opening and closing lid 12c of the reading apparatus 10c is opened; FIG. 9 (*b*) shows a closed state in which the opening and closing lid 12c of the reading apparatus 10c is closed.

The opening and closing lid 12c is arranged to cover the opening H arranged at a substantially cylindrical housing 11c. The opening and closing lid 12c is a substantially cylindrical lid that can be rotated in a direction indicated by an arrow X7 around an axis AX and is provided with an opening H1 having a size corresponding to the size of the opening H of the housing 11c at the lateral side thereof. In the example shown in FIG. 9, the opening and closing lid 12c can be turned into the opened state (FIG. 9 (*a*)) if rotated in the direction indicated by the arrow X7 to a position where the opening H1 thereof is overlapped with the opening H of the housing 11c. Further, the opening and closing lid 12c can be turned into the closed state (FIG. 9 (*b*)) if rotated to a position where the opening H1 thereof is not overlapped with the opening H of the housing 11c. It is applicable to integrate the bottom surface of the opening and closing lid 12c with the placing table 14 mentioned above so that the shopping basket C is rotated along with the rotation of the opening and closing lid 12c.

Herein, the opening and closing lid 12c may be rotated manually or automatically in response to the reading start instruction and the like. In a case in which the opening and closing lid 12c is rotated automatically, the reader/writer control section 302 controls to read the RFID tag when the opening and closing lid 12c is in the closed state. Further, the reader/writer control section 302 may control to terminate the reading of the RFID tag if the opening and closing lid 12c is rotated for a pre-determined number of times (for example, 1 cycle).

In order to prevent external electric waves from reaching into the reading room 13, the housing 11c and the opening and closing lid 12c are made with the electric wave reflecting material or the electric wave absorbing material. For example, it is also applicable that the outer wall (outer surface) of the housing 11c and the opening and closing lid 12c and the inner wall (inner surface) of the housing 11c and the opening and closing lid 12c that forms the reading room 13 are covered with the electric wave reflecting material or the electric wave absorbing material.

In this way, similar to the embodiments described above, the influence brought by the environment surrounding the reading apparatus 10c to the reading operation can be reduced, and thus, the reading of the RFID tag T can be carried out more efficiently.

The type of the opening and closing lid 12 is not limited to those described in the modifications 1-3. For example, the opening and closing lid 12 may be a drawer-type lid or a door-type lid such as double-door type lid. No matter what type the opening and closing lid 12 is of, the housing 11 and the opening and closing lid 12 are made with the electric wave reflecting material or the electric wave absorbing material.

The programs executed in each apparatus of the present embodiment are installed in a storage medium (ROM or storage section) of each apparatus in advance; however, the present invention is not limited to this. The programs executed in each apparatus of the present embodiment may be recorded in a computer-readable recording medium such as CD-ROM, flexible disk (FD), CD-R, DVD (Digital Versatile Disk) and the like in the form of installable or executable file. Further, the storage medium, which is not limited to a medium independent from a computer or an incorporated system, further includes a storage medium for storing or temporarily storing the downloaded program transmitted via an LAN or the Internet.

Further, the programs executed in each apparatus of the present embodiment may be stored in a computer connected with a network such as Internet, and downloaded via the network. Further, the program executed in each apparatus of the present embodiment may also be provided or distributed via a network such as the Internet.

What is claimed is:

1. A reading apparatus which reads information from a RFID tag attached to a commodity comprising:
   a housing which includes an opening serving as an entrance/exit of the commodity and space for housing the commodity inside;
   an antenna arranged in the space;
   an opening and closing lid for opening and closing the opening;
   a reading module which reads information relating to the commodity from the RFID tag attached to each commodity housed in the housing through the antenna;
   an output module which outputs the information read by the reading module; and
   a notifying module which notifies that the opening and closing lid is in an opened state if the opening and closing lid is turned into the opened state during a period after reading by the reading module is started and before the reading is completed, wherein
   the reading module starts reading if the opening and closing lid is turned into a closed state and the reading module resets read information if the opening and closing lid is turned into the opened state before the reading is completed.

2. The reading apparatus according to claim 1, wherein at least one of the antennas is arranged at the bottom surface of the housing.

3. The reading apparatus according to claim 1, wherein
the housing includes a placing table in the space for placing the commodity; and
the antenna is arranged at the bottom surface opposite to the commodity surface of the placing table.

4. The reading apparatus according to claim 2, wherein
the housing includes a placing table in the space for placing the commodity; and
the antenna is arranged at the bottom surface opposite to the commodity placing surface of the placing table.

5. The reading apparatus according to claim 3, wherein
the placing table is made with an electric wave permeable material.

6. The reading apparatus according to claim 1, wherein
the housing includes an opening that is large enough so that a shopping basket can pass through, and space that is large enough to house the shopping basket.

7. A commodity sales data processing apparatus comprising:
a reading apparatus equipped with a housing which includes an opening serving as an entrance/exit of a commodity and space for housing the commodity inside, an antenna arranged in the space, an opening and closing lid for opening and closing the opening, and a reading module which reads information relating to the commodity from a RFID tag attached to each commodity housed in the space through the antenna; and
a registration module which executes commodity registration processing for the commodity housed in the reading apparatus based on the information read by the reading module; and
a notifying module which notifies that the opening and closing lid is in an opened state if the opening and closing lid is turned into the opened state during a period after reading by the reading module is started and before the reading is completed, wherein
the reading module starts reading if the opening and closing lid is turned into a closed state and the reading module resets read information if the opening and closing lid is turned into the opened state before the reading is completed.

* * * * *